United States Patent [19]

de la Rosa

[11] 4,387,807

[45] Jun. 14, 1983

[54] RING COVER PROTECTOR FOR RECORDS

[76] Inventor: Jorge de la Rosa, 239 Beacon Ave., Jersey City, N.J. 07306

[21] Appl. No.: 308,416

[22] Filed: Oct. 2, 1981

[51] Int. Cl.³ .............................................. B65D 85/30
[52] U.S. Cl. ................................. 206/312; 206/309; 206/311; 206/45.23; 428/76; 428/65
[58] Field of Search ............... 206/309, 310, 311, 312, 206/313, 45.2, 45.23; 428/64, 65, 76

[56] References Cited

U.S. PATENT DOCUMENTS

| | | | |
|---|---|---|---|
| 3,094,208 | 6/1963 | Evans | 206/312 |
| 3,547,342 | 12/1970 | Smith et al. | 206/309 |
| 4,013,296 | 3/1977 | Keeney | 206/309 |

FOREIGN PATENT DOCUMENTS

| | | | |
|---|---|---|---|
| 803295 | 1/1969 | Canada | 206/309 |
| 1166839 | 11/1958 | France | 206/311 |
| 74891 | 1/1961 | France | 206/311 |

*Primary Examiner*—William R. Dixon, Jr.
*Attorney, Agent, or Firm*—Hammond & Littell, Weissenberger and Muserlian

[57] ABSTRACT

A case for enclosing a phonograph record, including a circular ring in which the record snap fits, and a circular cover adjacent each side of the record, the covers being hinged to the ring.

2 Claims, 5 Drawing Figures

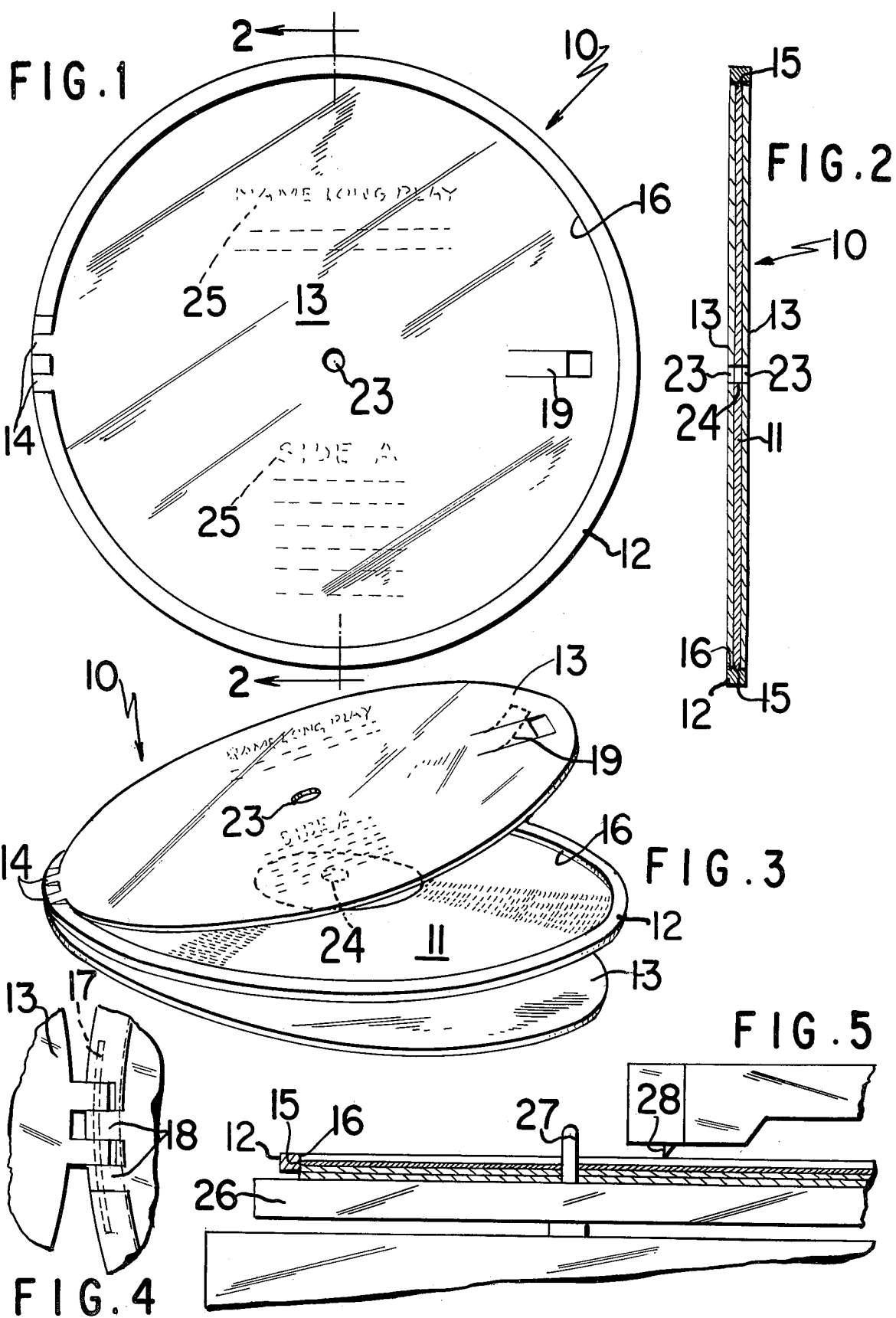

RING COVER PROTECTOR FOR RECORDS

This invention relates generally to storage cases for phonograph records.

It is well known that most phonograph records are finally destroyed by becoming scratched, and where even a slight scratch is often deep enough to prevent the record player needle from travelling the correct course of the record groove, so that the record can no longer be played without interruption. Most such scratches occur when the record is being transported in an exposed condition between the record storage album and the record player. Records are expensive to replace, and in time are no longer available, so that this situation is accordingly in need of an improvement.

Therefore it is a principal object of the present invention, to provide a case that replaces the conventional single record album with a case fitting directly upon the record player spindle and continuing to hold the phonograph record which is very minimally exposed and is thus in less danger of becoming damaged.

Another object of the present invention is to provide a case which keeps dust off the record surface so to not wear down the recording groove.

FIG. 1 is a side view of the invention.

FIG. 2 is a cross sectional view on line 2—2 of FIG. 1, showing a phonograph record contained inside the protector.

FIG. 3 is a perspective view thereof showing one side of the protector being pivoted upwardly.

FIG. 4 is an enlarged detail of the hinge construction for the two pivotable opposite sides.

FIG. 5 is a cross sectional view of the protector on a turntable, while the record is being played.

Referring now to the drawing in greater detail, the reference numeral 10 represents a Ring Cover Protector according to the present invention, and which serves as a protective album or case in which a phonograph record 11 is stored.

The case includes a circular ring 12 which fits around the record, and two circular covers 13 are pivotally secured to the ring by means of hinges 14 so to form opposite side walls of the case and between which the record is thus enclosed.

The ring includes a groove 15 on its inner side, and into which the rim of the record snap fits so that the record is permanently installed therein.

The ring accordingly is thicker than the records so that a groove 16 is formed on each side of the groove, one of the circular covers fitting in each of the groove 16.

Most of the parts are made of a semi hard plastic, except the two circular covers which are made of a magnetic self-adhesive plastic so to be inexpensive to manufacture and easy to keep clean. The hinges 14 may include a stiff wire hinge pin 17 that fits through hinge ears 18 of the hinge.

A central hole 23 through a center of each cover is the same as the record hole 24 and aligns therewith.

Printed indicia 25 on the outer side of each cover provide spaces for the title of the recorded work on each side of the record.

In use of the Ring Cover Protector 10, the cases may be stored on a shelf or rack, the same as a conventional album, so to store the single records in a protected manner. When playing the record it is not needed to remove the record from the case. The playing side of the record is exposed by simply pivoting the cover thereof out of the hole 16 and pivoting the cover adjacent the outer side of the other cover, and the record together with its case is thus place upon the record player turntable 26, with the holes 23 and 24 of the covers and the record fitting on the record player spindle 27, as shown in FIG. 5. The exposed side of the record faces up so that the needle 28 can travel in the record groove.

What is claimed is:

1. A protective cover for phonograph records comprising a circular ring provided with a groove about its inner circumference adapted to snap fit about a record, a flexible cover adjacent each side of the record being hinged to the ring with a stiff wire pin passing through hinge ears and accommodated in a groove in each side of the ring each cover being provided with a hole aligned with the central hole of the record.

2. The protective cover of claim 1 wherein the flexible covers are made of a magnetic, self-adhesive plastic material.

* * * * *